(12) United States Patent
Darnell et al.

(10) Patent No.: US 10,081,371 B2
(45) Date of Patent: *Sep. 25, 2018

(54) ADAPTIVE CONTROL OF MOTOR VEHICLE POWERTRAIN

(71) Applicant: Jaguar Land Rover Limited, Whitley, Coventry, Warwickshire (GB)

(72) Inventors: Paul Darnell, Royal Leamington Spa (GB); Elliot Hemes, Solihull (GB); Stephen Stacey, Mansfield (GB)

(73) Assignee: Jaguar Land Rover Limited, Whitley, Coventry (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/419,577

(22) Filed: Jan. 30, 2017

(65) Prior Publication Data

US 2017/0137036 A1 May 18, 2017

Related U.S. Application Data

(63) Continuation of application No. 14/372,788, filed as application No. PCT/EP2013/051439 on Jan. 25, 2013, now Pat. No. 9,555,703.

(30) Foreign Application Priority Data

Jan. 25, 2012 (GB) .................................. 1201200.1

(51) Int. Cl.
| | |
|---|---|
| *B60W 50/10* | (2012.01) |
| *B60W 50/08* | (2012.01) |
| *F02D 11/02* | (2006.01) |
| *F02D 41/24* | (2006.01) |
| *B60W 50/00* | (2006.01) |

(52) U.S. Cl.
CPC .......... *B60W 50/10* (2013.01); *B60W 50/082* (2013.01); *F02D 11/02* (2013.01);
(Continued)

(58) Field of Classification Search
CPC ............... B60W 50/10; B60W 50/082; B60W 2050/0026; B60W 2050/0014;
(Continued)

(56) References Cited

U.S. PATENT DOCUMENTS

| | | | |
|---|---|---|---|
| 5,265,570 | A | 11/1993 | Schnaibel et al. |
| 5,961,420 | A | 10/1999 | Darnell |

(Continued)

FOREIGN PATENT DOCUMENTS

| | | |
|---|---|---|
| DE | 19628655 C1 | 1/1998 |
| EP | 2502798 A1 | 9/2012 |

(Continued)

OTHER PUBLICATIONS

British Search Report for application No. GB1201200.1, dated May 2, 2012, 4 pages.

(Continued)

*Primary Examiner* — Khoi H Tran
*Assistant Examiner* — Robert T Nguyen
(74) *Attorney, Agent, or Firm* — Reising Ethington, P.C.

(57) ABSTRACT

A method and system for blending between torque maps of a source propulsion of a vehicle. The method and system are particularly applicable to automatic selection of an alternative torque map in response to a change of vehicle operating condition, for example, a change of terrain. Blending may substantially avoid a step change in response of the source of propulsion as accelerator position is changed.

20 Claims, 5 Drawing Sheets

(52) U.S. Cl.
CPC . *F02D 41/2422* (2013.01); *B60W 2050/0014* (2013.01); *B60W 2050/0024* (2013.01); *B60W 2050/0026* (2013.01); *B60W 2050/0042* (2013.01); *B60W 2050/0096* (2013.01); *B60W 2540/10* (2013.01); *B60W 2710/0611* (2013.01); *B60W 2710/0672* (2013.01); *F02D 2200/1002* (2013.01); *F02D 2200/602* (2013.01); *F02D 2200/606* (2013.01); *F02D 2200/702* (2013.01)

(58) Field of Classification Search
CPC . B60W 2050/0096; B60W 2050/0024; B60W 2050/0042; B60W 2540/10; B60W 2710/0611; B60W 2710/0672; F02C 11/02; F02C 2200/602; F02C 2200/1002; F02C 2200/606; F02C 2200/702; F02D 11/02; F02D 2200/602; F02D 2200/1002; F02D 2200/606; F02D 2200/702
See application file for complete search history.

(56) References Cited

U.S. PATENT DOCUMENTS

| | | | | |
|---|---|---|---|---|
| 7,349,776 B2* | 3/2008 | Spillane | ............ | B60G 17/0195 701/36 |
| 9,555,703 B2* | 1/2017 | Darnell | ................ | B60W 50/10 |
| 2008/0114521 A1 | 5/2008 | Doering | | |
| 2008/0300768 A1 | 12/2008 | Hijikata | | |
| 2011/0139117 A1* | 6/2011 | Kar | ...................... | F02D 11/105 123/395 |
| 2013/0080023 A1 | 3/2013 | Livshiz et al. | | |
| 2014/0358393 A1 | 12/2014 | Darnell et al. | | |

FOREIGN PATENT DOCUMENTS

| | | |
|---|---|---|
| FR | 2962096 A1 | 1/2012 |
| JP | H09147294 A | 6/1997 |
| JP | 2007069625 A | 3/2007 |
| JP | 2008168866 A | 7/2008 |
| WO | WO2009106168 A1 | 9/2009 |

OTHER PUBLICATIONS

International Search Report for International application No. PCT/EP2013/051439, dated May 7, 2013, 3 pages.
Written Opinion for International application No. PCT/EP2013/051439, dated May 7, 2013, 5 pages.
English summary of Japanese Office Action for JP application No. 2014-553729, dated Sep. 1, 2015, 2 pages.
European Office Action for EP application No. 13 703 745.3, dated Mar. 26, 2018, 9 pages.

* cited by examiner

ADAPTIVE CONTROL OF MOTOR VEHICLE POWERTRAIN

FIELD OF THE INVENTION

Embodiments of the present invention relate to adaptive control of a powertrain of a motor vehicle. In particular, embodiments of the present invention relate to adaptive control of a source of motive power, for example an internal combustion engine and in particular, but not exclusively, to the response of the engine to an operator command in consequence of a change of engine operating mode. The change of engine operating mode may in turn be related to a change of operating mode of a vehicle in which the engine is installed, for example an operating mode related to the terrain under a vehicle. Aspects of the invention relate to a method, to a system and to a vehicle.

BACKGROUND

Internal combustion engines of vehicles may have operating modes which may be selectable by the driver. Thus in some vehicles an economy mode, a normal mode and a sport mode may be provided, each mode having a different engine response to one or more commands of the driver. Typically the engine may respond differently in each mode to a given input of the accelerator pedal, being least responsive in economy mode, and most responsive in sport mode. In this way driveability of the vehicle can be improved by providing a range of accelerator pedal movement which is appropriate to, for example, the desired output torque characteristic of the engine. Such a system necessarily relies upon an electronic input from the vehicle driver, for example an accelerator potentiometer providing an input signal to an electronic control unit having a plurality of accelerator pedal position/output torque maps. The maps may also be referred to as accelerator pedal progression maps or pedal progression maps.

Another kind of operating mode relates to the terrain which a vehicle is intended to cross. U.S. Pat. No. 7,349,776, the content of which is hereby incorporated by reference, describes a vehicle control system in which the driver can implement improved control over a broad range of driving conditions, and in particular over a number of different terrains which may be encountered when driving off-road. In response to a driver input command relating to the terrain, the vehicle control system is selected to operate in one of a number of different driving modes including one or more terrain response (TR) modes. For each TR mode, the various vehicle subsystems are operated in a manner appropriate to the corresponding terrain.

In one arrangement, a mode (for example a winter mode) is available in which the vehicle is configured to launch from standstill in a forward gear other than first gear such as a second gear to reduce risk of excessive wheel slip. Different modes may have different accelerator pedal maps (amount of engine torque developed for a given accelerator pedal position), torque delivery (accelerator pedal maps in combination with a rate at which engagement of transmission clutches is controlled to take place thereby determining how aggressively gear shifts take place), and transmission shift points as a function of coefficient of surface friction. For example, in one or more TR modes the transmission shift points may be arranged wherein gear shifts take place at lower speeds than they might otherwise take place at, and in a more gentle manner (e.g. at a slower rate).

Thus one or more accelerator/torque maps appropriate to the terrain may be selectable by the driver. For example when driving in rocky terrain, a high torque output may be indicated for a small accelerator movement, thus giving immediate urge to overcome a rock step. In contrast on sand, a low torque output may be indicated for the same accelerator movement, so as to avoid spinning a vehicle wheel and digging a hole. To some extent the selected torque map may be a matter of judgment related to the available grip on the terrain.

All torque maps (pedal progression characteristics) associated with any vehicle operating mode coincide at minimum accelerator position/zero torque and maximum accelerator position/maximum torque. In between these conditions, a change of map causes an immediate change of engine output torque which may be disconcerting to the vehicle driver, especially if the accelerator pedal is not being moved at the time of change.

A change of torque map may also be undesirable at minimum accelerator position if the behavior of the vehicle is not as expected when the accelerator pedal is next advanced.

If an alternative operating mode is selected by the vehicle driver, a change in the characteristic of engine response is generally not a surprise—the change is in fact expected by the driver and is generally desirable. However difficulties may arise if the operating mode is automatically selected in response to a vehicle sensing a change of operating condition. Thus, for example a vehicle may detect a change of terrain from rock to sand and, whilst the accelerator is partly applied, command the vehicle engine to adopt a different torque map. A consequent instant change in engine response may be disconcerting to the driver, especially if such automatic mode changes are repeated frequently.

Likewise a change of mode as the vehicle is rolling to a halt (minimum accelerator pedal position) may mean that the next depression of the accelerator causes the vehicle to accelerate significantly differently to expectation.

FIG. 1 shows a known motor vehicle 101 having a powertrain 101P. The powertrain 101P includes an engine 121, a transmission 124, a power take-off unit (PTU) 137, a rear driveshaft or propshaft 131R and a front driveshaft or propshaft 131F. The rear driveshaft 131R is operable to drive a pair of rear wheels 113, 114 via a rear differential 135R whilst the front driveshaft 131F is operable to drive a pair of front wheels 111, 112 via a front differential 135F.

The vehicle 101 has an engine controller 121C arranged to receive an accelerator pedal position signal from an accelerator pedal 161 and a brakes controller 141C operable to receive a brake pedal position signal from a brake pedal 163.

In the configuration of FIG. 1 the transmission 124 is releasably connectable to the rear driveshaft 131R by means of the power transfer unit (PTU) 137, allowing selectable two wheel drive or four wheel drive operation.

The PTU 137 is also operable in a 'high ratio' or a low ratio' configuration, in which a gear ratio between an input shaft and an output shaft thereof is selected to be a high or low ratio. The high ratio configuration is suitable for general on-road or 'on-highway' operations whilst the low ratio configuration is more suitable for negotiating certain off-road terrain conditions and other low speed applications such as towing.

The vehicle 101 has a central controller 101C, referred to as a vehicle control unit (VCU) 101C. The VCU 101C receives and outputs a plurality of signals to and from various sensors and subsystems provided on the vehicle 101.

The vehicle 101 has a transmission mode selector dial 124S operable to select a required operating mode of the transmission 124. The selector dial 124S provides a control signal to a transmission controller 124C which in turn controls the transmission 124 to operate according to the selected mode. Available modes include a park mode, a reverse mode and a drive mode.

The vehicle 101 also has a terrain response mode selector dial 128S. The terrain response mode selector dial 128S is operable by a driver to select a required terrain response mode of operation of the vehicle.

It is to be understood that if a user selects the drive mode of the transmission 124, the engine controller 121C employs a drive mode throttle map to determine the amount of drive torque that the engine 121 should produce as a function of accelerator pedal position. If the user selects a 'dynamic' TR mode, the engine controller 121C employs a sport mode accelerator (or throttle) pedal progression map instead of the drive mode accelerator pedal progression map. The throttle maps differ in that the sport mode throttle map is arranged to provide a more aggressive response by the engine 121C to a given initial advance (such as depression) of the accelerator pedal 161.

Different throttle maps are also employed for different respective user-selectable terrain response modes.

As noted above, in some arrangements the vehicle may be operable automatically to select an appropriate TR mode for the prevailing driving conditions.

FIG. 2 shows two different accelerator pedal progression maps in the form of a plot of engine torque output T as a function of accelerator pedal position P on a scale from 0 to 100% of full scale depression of the accelerator pedal 161. Two extreme vehicle operating modes A,B are shown. Mode A is an initially cautious torque map and may correspond for example to a TR mode suitable for use when driving over sand. Mode B is a more aggressive torque map and may correspond to a TR mode suitable for use when driving over rock. A driver may select operation according to mode A or mode B my means of the TR mode selector dial 128S. At the zero and 100% accelerator positions, the torque maps coincide, but at part depression of the accelerator pedal significant differences in torque output are apparent.

Thus a switch from mode A to mode B at point C (50% application of accelerator pedal) results in an immediate jump to point D, with consequent increase in engine torque output. The characteristic of line B is subsequently followed whilst mode B is selected. A corresponding switch in the reverse direction to mode A results in significant drop in output torque. Changes between torque maps generally comprise movements in the direction of the y axis.

The change in output torque of the engine may take time, and can be deliberately blended, as illustrated in FIG. 3. Thus the increase from point C to point D may be controlled to avoid a step change. For example a maximum blending rate, say 7 Nm/s may be applied, and/or blending may take place at a defined rate within a maximum time period, of say 20 seconds. A small torque change will blend quickly, and a large torque change will take longer.

FIG. 4 illustrates a blending at a calibrated rate of, say, 7 Nm/s from a cautious torque map A to an aggressive torque map B. At each time interval t=1, t=2 etc., the cautious map approaches the aggressive map, but the shape of the cautious torque map is maintained until blending is complete, whereupon the characteristic follows the aggressive map B. Blending is generally in the direction of arrow E. Thus a change in accelerator position whilst blending is in progress does not change the sensitivity thereof.

Although blending is progressive, nevertheless the vehicle driver will still be subject to a sudden difference in sensitivity of the accelerator pedal, as the characteristic switches from the shape of the cautious map to the aggressive map, when blending is complete. Thus a blend may be in progress and have reached point F. Application of the accelerator pedal will result in an engine torque following the shape of the cautious map to point G, and then to follow the aggressive map towards point H. The step change in pedal response at point G may be disconcerting to the driver, since further application of the accelerator pedal suddenly has little effect upon engine torque output in this example.

What is required is a blending strategy that allows for switching between different torque maps without the vehicle driver being presented with a significant and unexpected change in accelerator pedal response. Such a strategy is suitable for a vehicle having manual switching between operating modes, and thus torque maps, and also where switching is automatic.

It is against this background that the present invention has been conceived. Aspects and embodiments of the invention may provide a method, a system or a vehicle in which blending of torque is improved. Other aims and advantages of the invention will become apparent from the following description, claims and drawings.

SUMMARY OF THE INVENTION

According to one aspect of the invention, there is provided a method of blending between different characteristics of accelerator pedal position and output torque in a vehicle implemented by a control system, the method comprising the steps of: detecting a first operating mode of a vehicle and applying a source characteristic; detecting a change of operating mode of the vehicle and selecting a target characteristic; blending the source characteristic to the target characteristic at a blending rate, said blending rate being a percentage per unit time of the difference between said characteristics, and providing a progressive change of characteristic throughout the range of accelerator pedal position.

It is to be understood that reference to 'percentage per unit time' of a difference between characteristics, such as 10% per unit time of the difference, is considered equivalent to 'proportion per unit time' of the difference, in contrast with an absolute value being a fixed quantity that is independent of the difference, for example a fixed quantity of 7 Nm per unit time.

The characteristic relating accelerator pedal position to output torque may directly indicate the torque output at the flywheel of an internal combustion engine, or may represent an analogue thereof, such as one or more of drive torque at the vehicle wheels, power output, another measure of tractive effort, fuel flow, air flow or any measurable indicator that varies according to accelerator pedal progression and torque output. The output torque may represent the output of other forms of motive power, such as an electric motor, or an analogue thereof, such as motor current. A vehicle may have one or more sources of propulsion. For example a hybrid electric vehicle may have an engine and at least one electric machine operable as a propulsion motor. An electric vehicle may have at least one electric machine operable as a propulsion motor.

Many suitable analogues are known, so that whilst torque is a convenient direct measure, embodiments of the invention do not exclude the use of one or more analogues to define the changing pedal progression characteristic.

Thus for blending to a new torque map, with different torque output for a given position of the accelerator pedal, blending gradually changes the shape of the characteristic from that of the first mode to that of a second mode having the target characteristic. The consequence is that a step change in the accelerator pedal position/output torque characteristic at a transition point between the two characteristics is avoided.

In one embodiment a maximum rate of change of torque is selectable, optionally by the control system. Thus rate of change may be determined as a maximum for a vehicle in any operating mode, and is mainly intended to ensure the comfort and safety of vehicle occupants.

In a refinement the maximum rate of change may be dependent upon a condition of use of the vehicle, such as whether the vehicle is in a high or low transmission range, and is intended to avoid unacceptable rates of change of output torque of a source of propulsion which may affect for example driveability or refinement of the vehicle in certain operating modes.

According to embodiments of the invention the time taken for completion of blending may be fixed for all accelerator positions, and be for example determined by the maximum time taken to achieve the widest transition at the maximum rate of change. Thus if the widest possible transition between accelerator pedal progression maps is 140 Nm, and the maximum allowable blend rate is 7 Nm/s, the time taken for completion of blending may be fixed at 20 s.

In one embodiment, however, transition between source and target torque characteristics is at the maximum permissible blending rate for all accelerator positions, so that where the transition is small, the blending time is correspondingly short.

At a fixed accelerator position according to an embodiment the blending rate is a percentage of the difference between the source and target characteristics. Blending is considered to be complete when the moving characteristic is substantially coincident with the target characteristic, say at greater than 95% completion.

Typically however the vehicle driver will make a change of accelerator position during blending from the torque characteristic of one vehicle mode to that of another vehicle mode. According to the present invention the degree of completion of the blend is applied to the torque difference at the new accelerator position in order to allow the blend to continue with reference to the starting characteristic (the source characteristic) at the new accelerator position. In the alternative the instant torque characteristic is considered to be the starting point for a new blend to a target torque characteristic, and blending towards the target is continued. That is, the degree of completion of the blend is applied to the torque difference at the new accelerator position and the instant torque characteristic at the instant degree of completion of blend. In other words, the blend is not reset and blending started again as if for the first time. Rather, blending continues from the new pedal position, assuming a proportion of blend is already complete. Therefore blending to the target characteristic takes place over the remaining proportion of the blend to be completed.

If a further mode change takes place whilst blending is in progress, the percentage completion of blending may be reset to zero and blending commenced from the instant accelerator pedal progression characteristic to the new target accelerator pedal progression characteristic. Other arrangements are also useful.

A typical refresh rate during blending may be 10 Hz or higher so that blending is not perceptible to the vehicle driver.

Optionally, said blending rate is a percentage per unit time of the difference between said characteristics when blending is initially commenced.

The method may include the step of maintaining said blending rate the same for all accelerator pedal positions.

The method may include the step of varying said blending rate dependent upon accelerator pedal position.

The method may include the step of limiting the blending rate such that it does not exceed a maximum value of absolute rate of change of torque.

Optionally, the maximum value of said rate of change of torque is 10 Nm per second, or less. Other values are also useful.

The method may include the step of determining accelerator pedal position at a refresh rate of 10 Hz or greater, 20 Hz or greater or any other suitable value, optionally 100 Hz.

The method may include the steps of: detecting a movement of the accelerator pedal to a new position; recalculating said blending rate according to the difference between said characteristics at the new position; and blending to said target characteristic from the new position.

Alternatively the method may include the steps of: detecting a movement of the accelerator pedal to a new position, recalculating said blending rate according to the difference between the instant characteristic at the time of said movement and said target characteristic, at said new position; and blending to said target characteristic from said new position.

The method may include the steps of: detecting movement of the accelerator pedal to a new position; recalculating said blending rate according to the difference between said characteristics at the said new position and the percentage of completion of blending when movement of the accelerator pedal is detected; and continuing blending to said target characteristic from said new position.

Alternatively the method may include the steps of: detecting movement of the accelerator pedal to a new position; recalculating said blending rate according to the difference between the instant characteristic at the time of said movement and said target characteristic, at said new position and the percentage of completion of blending when movement of the accelerator pedal is detected; and continuing blending to said target characteristic from said new position.

It is to be understood that, in some embodiments, when movement of the accelerator pedal is detected, the blending rate may be recalculated such that the proportion of completion of blending when movement of the accelerator pedal is detected is applied to the target and source torque characteristics at the new pedal position. Thus, if when movement of the accelerator pedal to a new position is detected the proportion of completion of blending represents 40%, the instantaneous torque required at the new position of the accelerator pedal is determined to correspond to 40% of completion of a blend between the values of torque at the source and target characteristics at the new pedal position. This calculation is performed repeatedly whilst the pedal is being moved in order to give an intermediate accelerator pedal progression characteristic that corresponds to a blend of the source and target pedal progression characteristics.

The difference between the instant amount of torque applied at the new accelerator pedal position and the amount that would be applied according to the target characteristic is taken to be the balance of the amount of blending remaining, i.e. 60% in this example.

It is to be understood that in some embodiments, at the new pedal position blending may be continued at the same percentage per unit time as was applied prior to detection of movement of the pedal. Thus, blending may continue at the same proportion per unit time of the difference between the source and target characteristics at the new pedal position. This same proportion per unit time may be applied unless the absolute value of blend rate so determined would then exceed a maximum allowable absolute rate, such as a rate of (say) 7 Nm/s. Other maximum values are also useful. Thus if the blend is 40% complete and the difference between the amount of torque applied at the current accelerator pedal position and the amount that would be applied if the target characteristic were applied at the same pedal position is 30 Nm, a blend rate of 10% per second where 30 Nm corresponds to a remaining amount of blending of 60%, would result in an absolute blend rate of 5 Nm/s. Since this is less than the maximum allowable value, blending continues at the rate of 5 Nm/s.

We consider next a scenario in which blending is commenced when a vehicle mode change takes place between source and target accelerator pedal progression maps having a torque difference of 50 Nm at the accelerator pedal position P1 when the mode change is triggered. Blending proceeds at the nominal default blending rate of 10% per second, i.e. at a rate of 5 Nm/s, which is less than the maximum allowable rate of 7 Nm/s in this example.

When the blend is 40% complete, the accelerator pedal position changes to position P2. The instant torque characteristic as the accelerator pedal position is changed from P1 to P2 is taken to be the amount of torque that would be applied at the instant accelerator pedal position according to the source characteristic plus a percentage of the difference between the source and target characteristics at the instant pedal position, the percentage corresponding to the percentage by which blending is complete. The blend percentage may in some embodiments be continually recalculated as the pedal is moved.

When the accelerator pedal reaches the new position P2, blending may in one embodiment continue at the same percentage per unit time of the difference between the source and target characteristics at the new accelerator pedal position P2 unless this value would exceed the maximum allowable absolute value (e.g. 7 Nm·s). If the amount would exceed the maximum allowable value, then in some embodiments, a control system implementing the method converts the maximum allowable value (in this example 7 Nm/s) into a percentage of the difference between the source and target characteristics at the new pedal position, and continues at a blend rate of this percentage of the difference between the source and target characteristics at the new accelerator pedal position P2. Blending thereby effectively continues at the maximum allowable rate. However, importantly, blending proceeds as a percentage per unit time of the difference between source and target characteristics. This has the advantage that if a change in accelerator pedal position P2 subsequently takes place whilst blending is in progress, an instant accelerator pedal progression characteristic may be generated by the control system as described above having a form as a function of pedal position P that is a blend of the forms of the source and target pedal progression characteristics.

If a blend is progressing at a blend rate below the maximum default blend rate of 10% per second due to the absolute value of this proportion exceeding the maximum allowable absolute value (e.g. 7 Nm/s), when the accelerator pedal is subsequently moved the instant characteristic continues to be determined by adding, to the torque value of the source pedal progression characteristic at the instant position of the accelerator pedal, a proportion of the difference between the source and target torques at that position. The proportion corresponds to (and in the present example is substantially equal to) the proportion of the blend that has been completed. This enables the instant pedal progression characteristic to be defined and followed as described above. The control system may continue the blend at the same proportion per unit time of the difference between the source and target characteristics at the new pedal position. Alternatively, the control system may in some embodiments determine whether blending may continue at a higher rate corresponding to the maximum blend rate of 10%, without exceeding the maximum absolute value of blend rate, in this example 7 Nm/s, We consider as an example the case where a blend is commenced between source and target characteristics having a torque difference exceeding 70 Nm at the instant pedal position, for example 140 Nm. At the default blend rate of 10% per second, blending would be expected to proceed at a rate of 14 Nm/s and take 10 s. However the absolute value of 14 Nm/s exceeds the maximum allowable absolute value of 7 Nm/s. Accordingly, the control system implementing the method determines the proportion of the difference in source and target torques represented by 7 Nm/s (in the present example 5%) and blending proceeds at a rate of 5% per second. The total blend time is therefore expected to be 20 s.

If the accelerator pedal position P subsequently changes when (say) 50% of the blend is complete, the control system may apply the proportion of completion of the blend (50%) to the difference between the instant torque at the new accelerator pedal position P and the target torque at the new accelerator pedal position. In an embodiment, the new difference is considered to represent a remaining amount to be blended of 50% of the difference between source and target characteristics. Blending therefore continues at a rate of 5% per second of the difference between the source and target characteristics at the new accelerator pedal position, and would take approximately 10 s to complete. Thus, if the absolute value of the new difference between source and target torques at the new accelerator pedal position was 50 Nm, blending would continue at an absolute rate of 2.5 Nm/s for the remaining 25 Nm or torque difference.

In an alternative embodiment, at the new pedal position, it is determined whether blending can continue at the maximum allowable rate of 10% per second of the difference between source and target torque values at the new pedal position. In the present example, 10% of the difference is 5 Nm, resulting in a blend rate of 5 Nm/s. This is less than the maximum allowable absolute value of 7 Nm/s and is therefore allowable. Thus, blending continues at the rate of 10% per second, i.e. 5 Nm/s, and it takes only 5 s to blend the remaining 25 Nm of torque difference.

The method may include the steps of: detecting a movement of the accelerator pedal to a new position; and blending to the target characteristic from said new position at a maximum blend rate being an absolute value of rate of change of torque.

This feature has the advantage that a blend may be completed relatively quickly once a user has moved the throttle pedal.

Optionally the step of detecting movement of the accelerator pedal to a new position comprises detecting an advance of the accelerator pedal to a new position.

The maximum blend rate may be 10 Nm per second, or less, optionally substantially 7 Nm per second, optionally a value from around 5 Nm per second to around 10 Nm per second. Other values are also useful.

Optionally the method includes the further steps of: detecting a further change of operating mode of a vehicle; selecting a new target characteristic; and blending at a blending rate to said new target characteristic from the instant characteristic at the time of said further mode change, and at the instant position of said accelerator pedal, said re-stated blending rate being a proportion per unit time of the difference between the instant characteristic and new target characteristic.

As described herein, the instant characteristic may be calculated as the weighted average of the original source and target characteristics, the weighted average being calculated according to the percentage completion of blending. This feature inherently enables blending of the form of the source and target characteristics such that a sudden change of form from the source to the target characteristics is not experienced by the driver, in contrast to the known method illustrated in FIG. 4.

In one aspect of the invention for which protection is sought there is provided an electronic control system for defining the output of a source of propulsion of a vehicle such as an engine in relation to the position of an accelerator pedal by reference to a plurality of torque maps held within a memory, said system being adapted to detect a first operating mode of the vehicle and apply a source torque map, to detect a change of operating mode of the vehicle and select a target torque map, and to blend the torque map applied to the vehicle from the source torque map to the target torque map at a blending rate defined as a percentage per unit time of the difference between said maps.

The system may be responsive to an automatic change of vehicle operating mode. The system may be operable to command a change of vehicle operating mode, optionally in response to one or more sensor inputs.

Optionally the blending rate is selectable. The blending rate may be selectable by the control system. In some embodiments the blending rate may be user selectable.

Optionally, blending is carried out at a refresh rate of 10 Hz or greater.

The system may be adapted to detect movement of an accelerator pedal to a new position after blending has commenced, to recalculate the blending rate according to the difference between an instant torque map and the target torque map, and to blend to the target torque map from said new position.

The instant torque map may correspond to a weighted average of the source and target torque maps according to a proportion of completion of blending from the source to the target torque maps.

In an embodiment, the blend rate is determined starting with a knowledge of the torque difference between the source and target characteristics, a minimum allowable absolute blend time and a maximum allowable blend rate. It is first determined how long the blend would take to complete at the maximum allowable blend rate. If this time period is greater than or substantially equal to the minimum period, the maximum absolute blend rate is converted to a percentage per unit time of the torque difference between the source and target characteristics. Blending then progresses at this proportion per unit time of the difference between the characteristics.

If the blend period would be less than the minimum period, then the blend rate is determined as that rate which will result in a blend period substantially equal to the minimum period. Thus in one embodiment, the rate is determined as a percentage per unit time corresponding to 100/(minimum time period) per unit time. The blend then proceeds at this proportion per unit time of the difference between the characteristics.

In a further aspect of the invention for which protection is sought there is provided a vehicle having an electronic control system according to the preceding aspect. The system may be operable automatically to change operating mode according to conditions of use whereby one of a plurality of torque maps is selected for each operating mode.

Embodiments of the present invention also provide an electronic control system incorporating a method according to an embodiment of the invention, and a vehicle incorporating the control system and having a system of changing vehicle mode, typically automatically, according to operating conditions thereof.

According to another aspect of the invention for which protection is sought there is provided an electronic control system for defining the output of a source of propulsion of a vehicle such as an engine in relation to the position of an accelerator pedal by reference to a plurality of torque maps held within a memory, said system being adapted to detect a source operating mode of the vehicle and apply a source map, to detect a target operating mode and select a target map, and to blend from the source map to the target map at a blending rate defined as a percentage per unit time of the difference between said maps.

Aspects of the invention for which protection is sought also provide a vehicle having such an electronic control system and a system of changing an operating mode thereof.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described in connection with one embodiment are applicable to all embodiments unless such features are incompatible.

BRIEF DESCRIPTION OF THE DRAWINGS

Embodiments of the present invention will now be described, by way of example only, with reference to the accompanying drawings in which.

DETAILED DESCRIPTION

Figure 1:
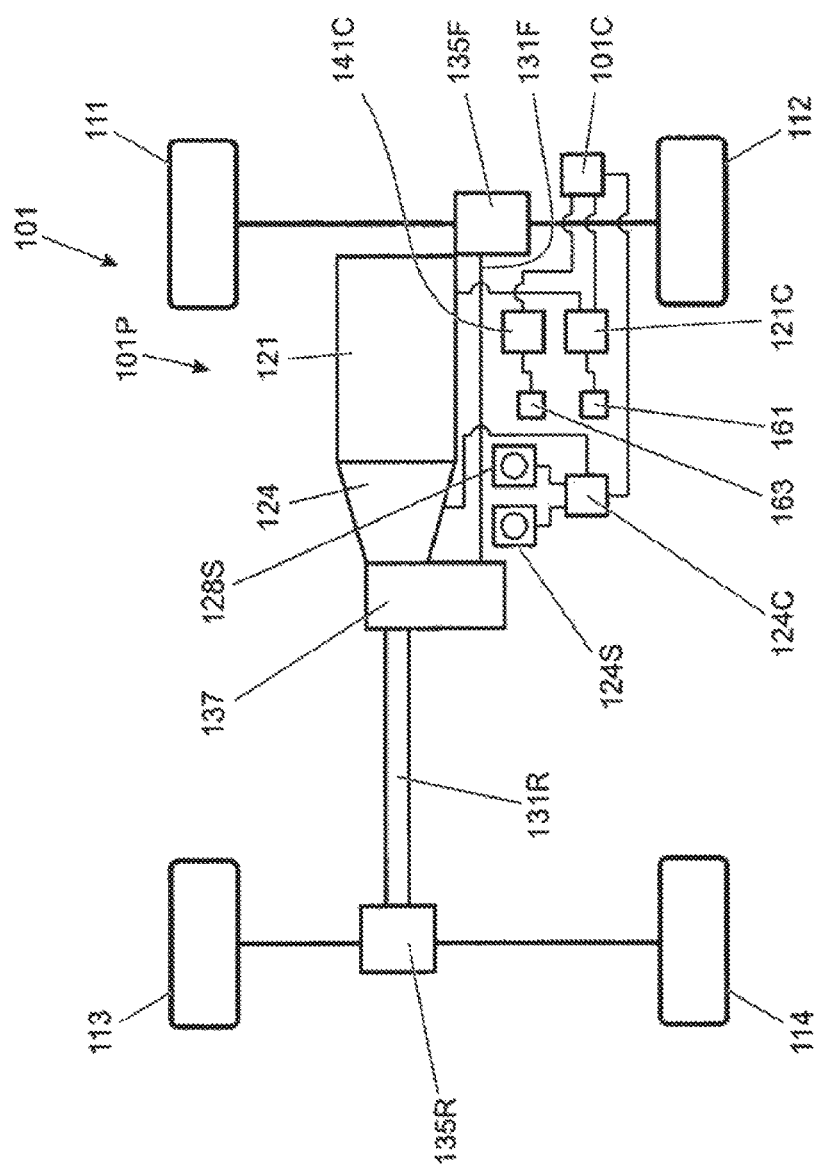
FIG. 1 is a schematic illustration of a known motor vehicle.
Figure 2:
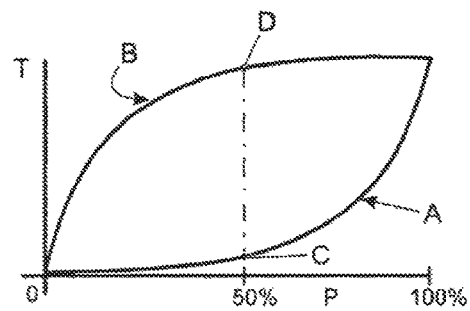
FIGS. 2 to 4 represent prior art blending of torque maps.
Figure 5:
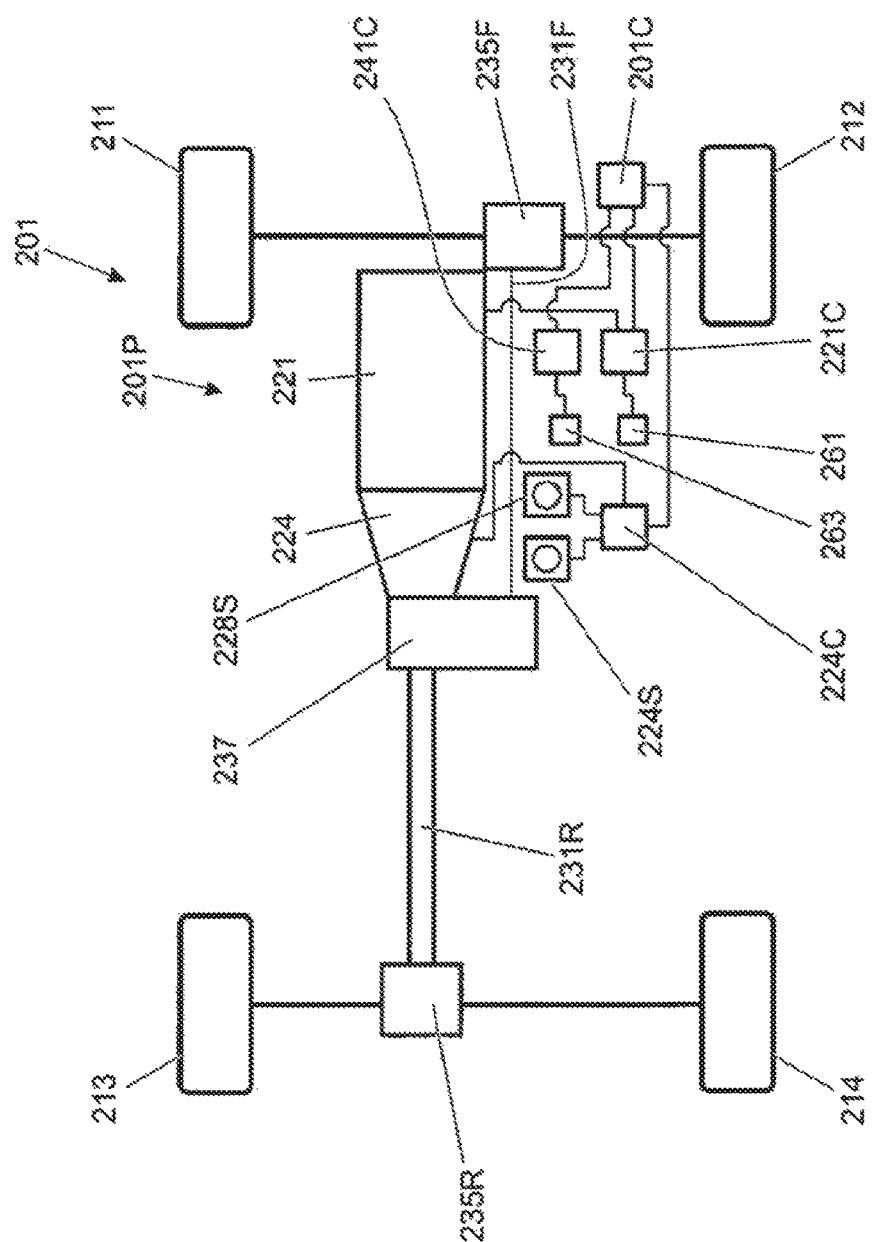
FIG. 5 is a schematic illustration of a motor vehicle according to an embodiment of the present invention.

FIG. 5 is a schematic illustration of a motor vehicle 201 according to an embodiment of the present invention. Like features of the vehicle 201 of FIG. 5 to those of the vehicle 101 of FIG. 1 are shown with like reference numerals prefixed numeral 2 instead of numeral 1. Thus engine 121 of the vehicle 101 of FIG. 1 corresponds to engine 221 of the vehicle 221 of FIG. 5.

The vehicle 201 has a VCU 201 programmed with accelerator pedal progression maps that are used to determine engine torque T as a function of accelerator pedal position P.

Figure 6:
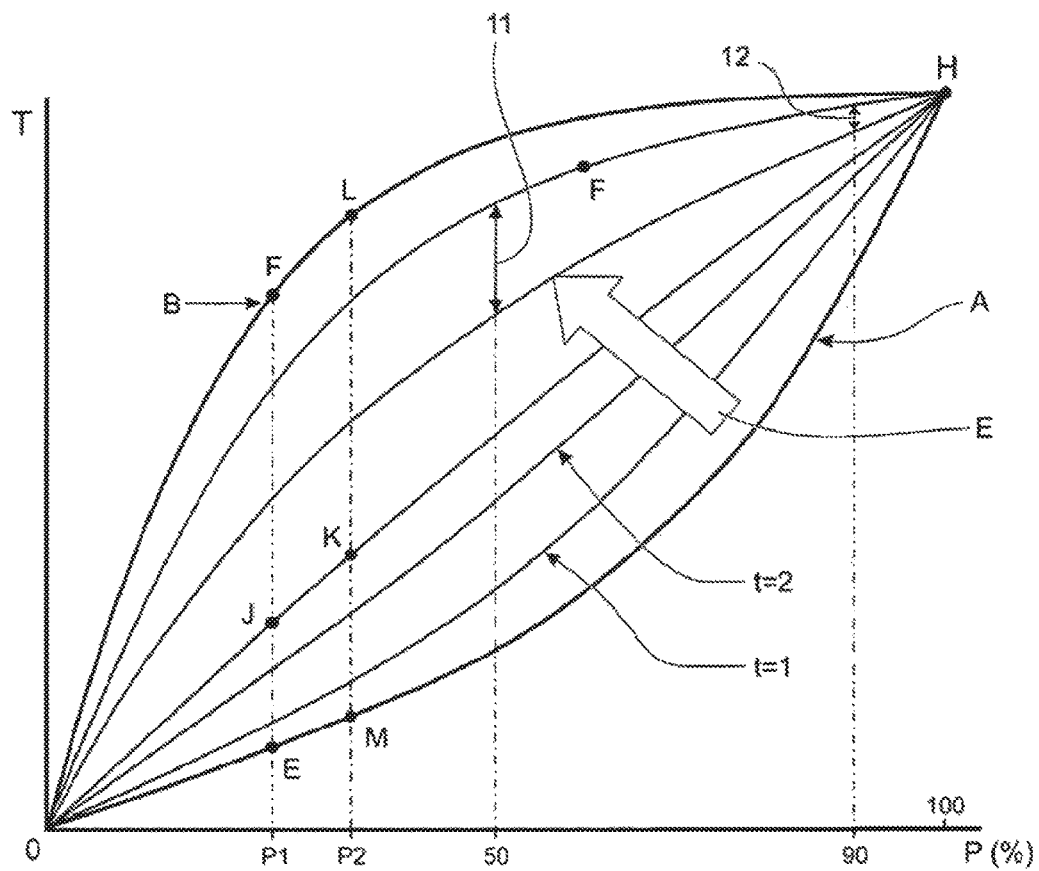
FIG. 6 illustrates torque blending according to an embodiment of the invention.
Figure 7:
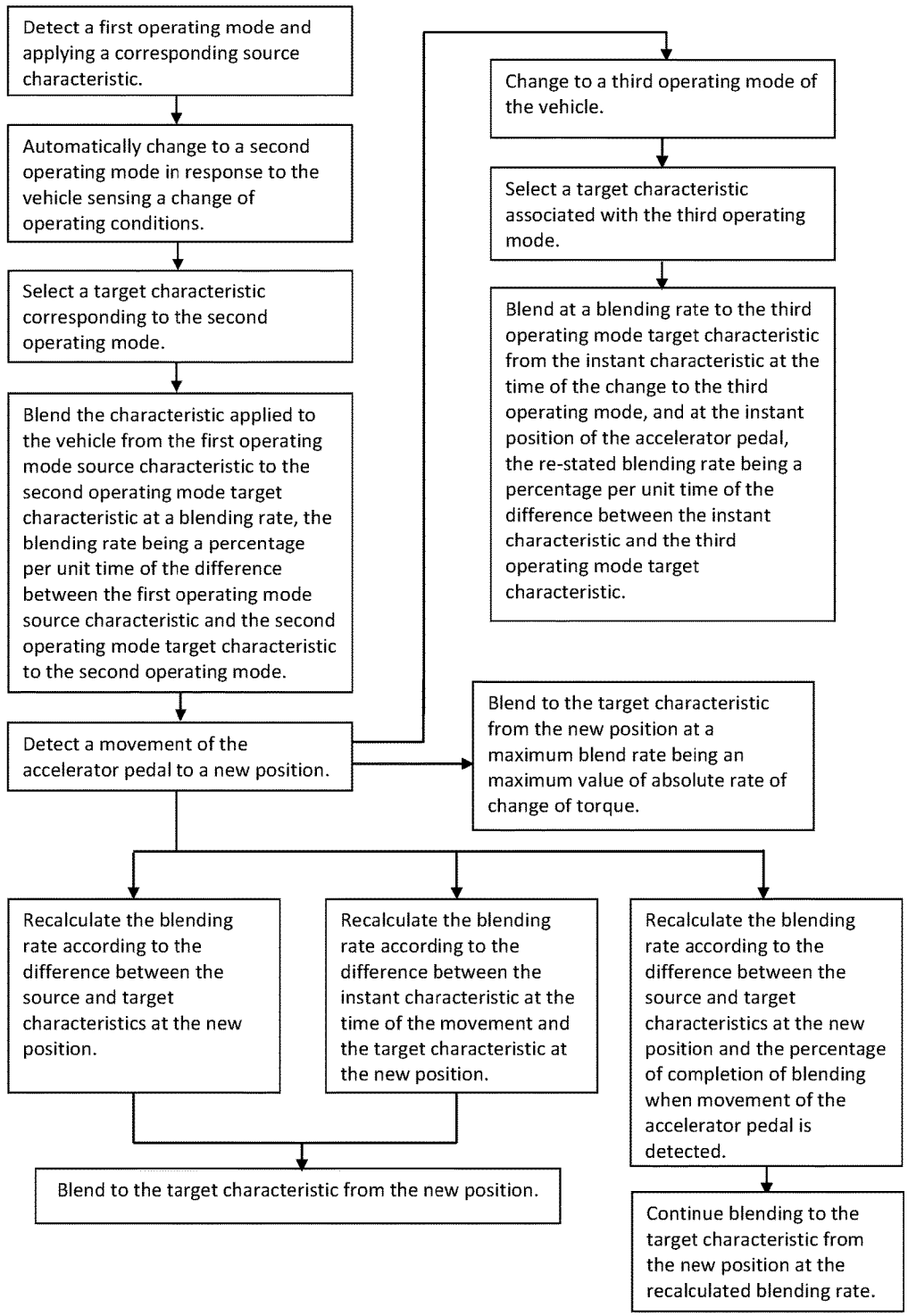
FIG. 7 illustrates a method according to an embodiment of the invention, as discussed throughout the description below.

FIG. 6 shows a plot of engine torque (T) against percentage of maximum accelerator position (P). A cautious characteristic is marked A, and an aggressive characteristic is marked B.

In the event of a change of vehicle operating mode whereby for example the cautious characteristic is blended to the aggressive characteristic, blending is in the direction of arrow E, and the progress of the blend is indicated at time t=1, t=2 etc.

Figure 3:
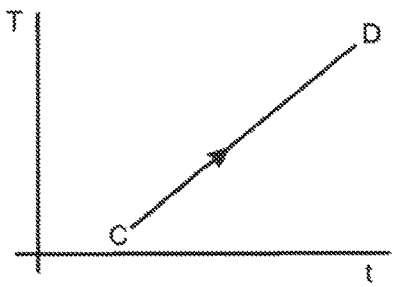

According to the embodiment of FIG. 5 and as illustrated in FIG. 6, the engine torque characteristic progressively changes shape as the blend progresses so that, for example, an increase of accelerator pedal position at point F will follow the blending characteristic toward maximum (point H). Such a blend has no significant step change, in contrast to FIG. 3 where a change in accelerator pedal position from P1 to P=100% along line FGH results in a step change in the response at point G.

In one embodiment the blend output, at any stage during the blend, is a weighted average of the torque of the original mode and the torque of the newly demanded mode. A change in accelerator position during blending causes the vehicle engine to follow the instant torque characteristic at the percentage of completion of the blend, as described in more detail above and below.

Figure 4:
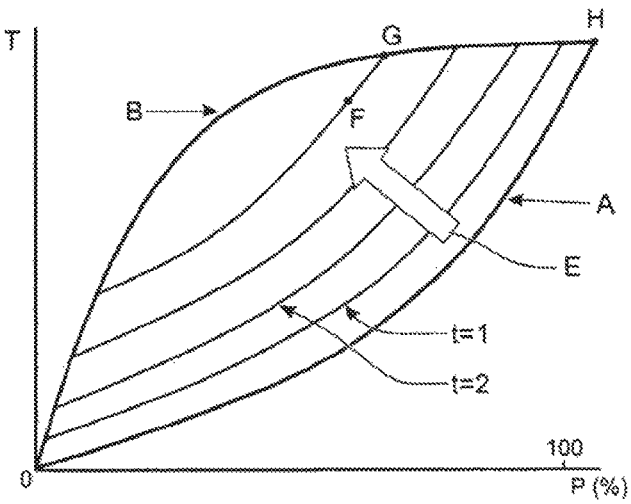

The instant torque characteristic is determined as the weighted average of the torque of the original mode and the torque of the newly demanded mode at the instant position of the accelerator pedal. The weighted average is given by the percentage completion of the blend. Thus if a blend is 40% complete and the accelerator pedal position is changed, the VCU 201C calculates the amount of torque to be generated by the engine 221 at a given instant as the amount of torque that would be developed at the instant accelerator pedal position according to the original mode (e.g. by reference to progression map A) plus 40% of the difference between the amount of torque that would be developed at the instant accelerator pedal position according to the original mode and that which would be developed at the instant accelerator pedal position according to the newly demanded mode. This feature has the advantage that the instant pedal progression map gradually changes form from that of the original mode to that of the newly demanded mode as blending progresses, rather than retaining the form of the original mode, as per the known arrangement of FIG. 4.

In other words, in the embodiment of FIG. 5, in the event that a change in accelerator pedal position takes place, the value of engine torque corresponds substantially continuously to a weighted average of the torque of the original mode and the torque of the newly demanded mode at a given pedal position, the weighting being given by the percentage of completion of blending. The weighting may change as blending progresses even whilst the accelerator pedal 261 is being moved.

The rate of blending may be a fixed percentage per unit time, for example 10% per second. The absolute value of the rate of blending may however be capped at a prescribed maximum allowable rate of blending. The prescribed maximum rate may be any suitable rate, for example 7 Nm/s, 10 Nm/s or any other suitable value. It is to be understood that suitable values may be determined empirically.

The fixed rate of blending may be continually converted by the VCU 201C into a percentage per second value based on the current torque difference between the original and target characteristics.

It is to be understood that the feature of a progressive change of characteristic from the original to the target characteristic throughout the range of accelerator pedal position is fundamental to embodiments of the present invention.

In one example, at a given position of the accelerator pedal 261, a torque difference of 140 Nm may exist between characteristics. At a blending rate of 10% of this value, the blending rate would be 14 Nm/s, which exceeds the maximum allowable blending rate of 7 Nm/s for the present embodiment. At a blending rate of 7 Nm/s, the time of blend is 20 seconds, and accordingly a blending rate of 5% per second is applied to give a continuous transformation of the torque characteristic between old and new. The blending rate of 5% per second may be maintained even if the driver subsequently changes the accelerator pedal position. However if under these circumstances the blending rate would exceed 7 Nm/s, the maximum allowable blending rate would be employed, which in the present embodiment is 7 Nm/s. In some embodiments the percentage blending rate represented by the maximum allowable blending rate would be recalculated and applied.

In an alternatively method, the blending rate may be recalculated depending on the difference between torque values of the original (source) and newly demanded (target) modes at the new accelerator pedal position. In some embodiments the blending rate may be recalculated depending on the difference between torque values of the instant torque characteristic (being a weighted average of the original and target characteristics) and target characteristic at the new accelerator pedal position.

It will be appreciated that embodiments of the present invention avoid a step change in the sensitivity of the position of the accelerator pedal 161, so that a small change of pedal position during blending will allow the vehicle driver to become accustomed to the changing shape of torque characteristic.

It is to be understood that where the target blending rate is a fixed amount per unit time, say 10% per second, the target blending rate may be substantially equal to 10% per second up to the maximum allowable absolute value of (say) 7 Nm/s.

Thus, where a torque difference of (say) 70 Nm applies, the time of blend may be 10 seconds at a blending rate of 7 Nm/s (10% per second), corresponding to the maximum allowable rate. If the torque difference is less than 70 Nm, then the blending rate may be set at 10% of the difference. In the case of a difference of 50 Nm, the blending rate will be 5 Nm/s.

With reference to FIG. 6, a percentage progression of blending at 50% accelerator position has a greater absolute effect on engine torque than the same percentage change at 90% accelerator position. Thus the change represented by double headed arrow 11 is greater than that of arrow 12, and in consequence the torque characteristic changes progressively between characteristic A and characteristic B.

It is to be understood that as described above, the time taken for progression to a target torque map may be set in dependence upon the maximum rate of blending which is acceptable to a vehicle driver without causing a disconcerting effect. As described above this rate may be quite low, e.g. 7 Nm/s, in relation to a maximum difference in torque maps of say 140 Nm. At a steady state such a blend will take 20 seconds. As the torque maps converge, however, the absolute difference is smaller, and accordingly transition time at the maximum rate is also smaller. This can be disconcerting to a driver. However embodiments of the present invention are distinguished in that that for each position of the accelerator pedal, the transition between torque maps (i.e. the blend) is made in percentage steps rather than in absolute amounts. Thus, as the absolute difference between torque maps reduces, the absolute blend rate (in Nm/s) reduces accordingly.

During blending the refresh rate of determining accelerator pedal position may be any suitable value such as 50 Hz or higher. This means that the existing (source) and target torque characteristics are continually assessed at the refresh rate to determine the instant torque to be demanded from the engine, and at a rate which the vehicle driver will not notice.

As described above, a change in accelerator position during blending causes the vehicle engine 221 to follow the instant torque characteristic at the percentage of completion of the blend. Thus for example an increasing (advancing) accelerator pedal 161 may shift a partly completed blend from point J to point K of FIG. 6. This change is computed virtually instantaneously at a refresh rate of 50 Hz, and the driver experiences an increased torque output from the engine 221 in response to advancing the accelerator pedal 161.

In one embodiment, the new torque output (K) is considered the starting point for a new blend toward a target torque (L) on the target characteristic at an unchanged throttle opening, and a new blend is commenced, preferably at the maximum permissible rate.

Further changes in throttle have the same effect.

Alternative strategies may retain the percentage completion of blending at point J (corresponding to accelerator pedal position P1), and apply it to the target and existing torque characteristics at point K (L & M). Thus if point J represents 40% completion of blend, point K is determined as 40% of completion of a blend between points M & L, and the blend is continued from point K to point L. It is to be understood that the position of point K is of course defined with respect to the percentage of completion of blending, in order that the instant torque characteristic itself represents a blend between the source and target characteristics. This allows a driver to gain familiarity with the changing torque characteristic from characteristic A to B as the blend takes place.

The blend may continue at point K towards point L at the same percentage per unit time of the difference between the target and source characteristics (the difference between characteristics A and B at pedal position P2) as was employed at accelerator pedal position P1. Thus if the percentage blend rate was 10% per second of the torque difference between points E and F, the blend may continue from point K to point L at 10% per second of the torque difference between points M and L. If this value would exceed the prescribed maximum allowable rate of change (in the present embodiment this is 7 Nm/s) then the blend may be capped, and continue at a proportion per unit time corresponding to the maximum allowable absolute rate, such as 7 Nm/s. Other arrangements are also useful.

At a refresh rate of 50 Hz, the recalculation of blending is always faster than movement of the accelerator pedal position, and thus imperceptible to the vehicle driver.

It is to be understood that embodiments of the invention are suitable for use with vehicles in which the transmission 124 is arranged to drive only a pair of front wheels 111, 112 or only a pair of rear wheels 114, 115 (i.e. front wheel drive vehicles or rear wheel drive vehicles) or selectable two wheel drive/four wheel drive vehicles. Embodiments of the present invention may be suitable for vehicles having more than four wheels or less than four wheels.

A method and system is disclosed herein for blending between torque maps of a source of propulsion of a vehicle. Embodiments of the present invention are particularly applicable to automatic selection of an alternative torque map in response to a change of vehicle operating condition, for example a change of terrain. Blending according to embodiments of the present invention may substantially avoid a step change in response of the source of propulsion as accelerator position is changed.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A method of blending between different characteristics of accelerator pedal position and output torque in a vehicle, the method being implemented by an electronic control system and comprising:
   detecting a first operating mode of a vehicle and applying a source characteristic corresponding to the first operating mode;
   changing to a second operating mode of the vehicle wherein the change is automatically made in response to the vehicle sensing a change of operating conditions, and selecting a target characteristic corresponding to the second operating mode;
   blending by the electronic control system the characteristic applied to the vehicle from the first operating mode source characteristic to the second operating mode target characteristic at a blending rate, the blending rate being a percentage per unit time of the difference between the first operating mode source characteristic and the second operating mode target characteristic.

2. The method according to claim 1, comprising at least one of:
   maintaining the blending rate the same for all accelerator pedal positions;
   varying the blending rate dependent upon accelerator pedal positions;
   limiting the blending rate such that it does not exceed a maximum value of absolute rate of change of torque; or
   determining accelerator pedal position at a refresh rate of 20 Hz or greater.

3. The method according to claim 1, comprising:
   detecting a movement of the accelerator pedal to a new position;

recalculating the blending rate according to the difference between the source and target characteristics at the new position; and blending to the target characteristic from the new position.

4. The method according to claim 1, comprising:

detecting a movement of the accelerator pedal to a new position, recalculating the blending rate according to the difference between the instant characteristic at the time of the movement and the target characteristic at the new position; and blending to the target characteristic from the new position.

5. The method according to claim 1, comprising:

detecting movement of the accelerator pedal to a new position;

recalculating the blending rate according to the difference between the source and target characteristics at the new position and the percentage of completion of blending when movement of the accelerator pedal is detected; and continuing blending to the target characteristic from the new position at the recalculated blending rate.

6. The method according to claim 1, comprising:

detecting a movement of the accelerator pedal to a new position; and blending to the target characteristic from the new position at a maximum blend rate being a maximum value of absolute rate of change of torque.

7. The method according to claim 1, comprising:

changing the operating mode of a vehicle to a third operating mode of the vehicle;

selecting a target characteristic associated with the third operating mode; and blending at a blending rate to the third operating mode target characteristic from the instant characteristic at the time of the change to the third operating mode, and at the instant position of the accelerator pedal, the re-stated blending rate being a percentage per unit time of the difference between the instant characteristic and the third operating mode target characteristic.

8. The method according to claim 1, wherein the source characteristic comprises a source torque characteristic and the target characteristic comprises a target torque characteristic.

9. The method according to claim 8, wherein the source torque characteristic comprises a first torque map and the target torque characteristic comprises a second torque map.

10. The method according to claim 1, wherein the first operating mode comprises a first terrain type and wherein the change of operating mode comprises a change to a second terrain type.

11. The method according to claim 1, wherein the first operating mode comprises one of an economy mode of operation, a normal mode of operation, or a sports mode of operation and wherein the change of operating mode comprises a change to another of the economy, normal and sports modes of operation.

12. The method according to claim 1 comprising operating the vehicle using the target characteristic.

13. The method according to claim 1 comprising detecting a change to the second operating mode.

14. A vehicle electronic control system for defining output torque in relation to the position of an accelerator pedal by reference to a plurality of torque characteristics held within a memory, the system comprising at least one controller configured to:

detect a first operating mode of the vehicle and apply a source torque characteristic associated with first operating mode;

detect a change of operating mode of the vehicle from the first operating mode to a second operating mode wherein the change is automatically made in response to the vehicle sensing a change of operating conditions, and select a target torque characteristic associated with the second operating mode; and blend the torque characteristic applied to the vehicle from the first operating mode source torque characteristic to the target torque characteristic at a blending rate defined as a percentage per unit time of the difference between the maps.

15. The system according to claim 14 wherein the controller is configured to detect movement of an accelerator pedal to a new position after blending has commenced, to recalculate the blending rate according to the difference between an instant torque characteristic and the target torque characteristic, and to blend to the target torque characteristic from the new position.

16. The system according to claim 15, wherein the instant torque characteristic corresponds to a weighted average of the source and target torque characteristics according to a percentage of completion of blending from the source to the target torque characteristics.

17. The system according to claim 14, wherein the source torque characteristic comprises a first torque map and the target torque characteristic comprises a second torque map.

18. The system according to claim 14, wherein the first operating mode comprises a first terrain type and wherein the change of operating mode comprises a change to a second terrain type.

19. The system according to claim 14, wherein the first operating mode comprises one of an economy mode of operation, a normal mode of operation, or a sports mode of operation and wherein the change of operating mode comprises a change to another of the economy, normal and sports modes of operation.

20. A vehicle having an electronic control system according to claim 14, and a system of automatically changing operating mode of the vehicle according to conditions of use whereby one of a plurality of torque characteristics is selected for each operating mode.

* * * * *